(12) United States Patent
Lobet et al.

(10) Patent No.: US 9,126,202 B2
(45) Date of Patent: Sep. 8, 2015

(54) MODULAR MOUNTING AND CONNECTION OR INTERCONNECTION SYSTEM FOR MICROFLUIDIC DEVICES

(75) Inventors: Olivier Lobet, Mennecy (FR); Paul Delautre, Lisses (FR)

(73) Assignee: Corning Incorporated, Corning, NY (US)

( * ) Notice: Subject to any disclaimer, the term of this patent is extended or adjusted under 35 U.S.C. 154(b) by 720 days.

(21) Appl. No.: 12/300,042

(22) PCT Filed: May 9, 2007

(86) PCT No.: PCT/EP2007/054498
§ 371 (c)(1),
(2), (4) Date: Nov. 7, 2008

(87) PCT Pub. No.: WO2007/131925
PCT Pub. Date: Nov. 22, 2007

(65) Prior Publication Data
US 2009/0183791 A1 Jul. 23, 2009

(30) Foreign Application Priority Data
May 11, 2006 (EP) .................................. 06300456

(51) Int. Cl.
*F15C 5/00* (2006.01)
*B81B 7/00* (2006.01)
*B01L 9/00* (2006.01)
(Continued)

(52) U.S. Cl.
CPC .......... *B01L 9/527* (2013.01); *B01J 2219/0081* (2013.01); *B01J 2219/0813* (2013.01); *B01L 3/565* (2013.01); *B01L 2200/026* (2013.01); *B01L 2200/027* (2013.01); *B01L 2200/028* (2013.01); *B01L 2300/0816* (2013.01); *F16B 2/06* (2013.01); *Y10T 403/18* (2013.01)

(58) Field of Classification Search
USPC ............ 137/597, 594, 454.4, 454.5; 422/504, 422/104, 537
See application file for complete search history.

(56) References Cited

U.S. PATENT DOCUMENTS

| | | | |
|---|---|---|---|
| 5,950,674 A * | 9/1999 | Wylie et al. .................... | 137/597 |
| 6,319,476 B1 * | 11/2001 | Victor et al. ................... | 422/502 |
| 6,832,787 B1 * | 12/2004 | Renzi ........................... | 285/124.1 |
| 7,605,002 B2 * | 10/2009 | Summersgill et al. ........ | 436/174 |

(Continued)

*Primary Examiner* — Jennifer Wecker
(74) *Attorney, Agent, or Firm* — Gregory V. Bean

(57) ABSTRACT

A modular mounting and connection or interconnection system for microfluidic devices (20) includes a plurality of end-butting compression-sealing fluid connectors or adapters (32), and one or more clamping structures (54, 56) each structured to hold one of the fluid connectors (32) in compression against a planar surface of a microfluidic device (20), and to press against the device, on another directly opposing planar surface thereof, either a contact pad (48) or another of the fluid connectors (32), with each clamping structure (54, 56) including an individually moveable compression-providing element such as a compression screw (36) structured to provide a controlled amount of compression. The system desirably further includes one or more device frames (58) each structured so as to receive and hold a microfluidic device (20) with one or more of the clamping structures (54, 56) attached, the device frame (58) being structured to retain the device (20) and attached clamping structures (54, 56) by constraining only one or two of the clamping structures (54, 56) in a manner such that no torsion or bending is applied to the device (20), and one or more system frames (70) structured so as to receive and hold a plurality of device frames (58) in proximity to each other in a three-dimensional array, such that volumes of desired fluid interconnections between devices (20) can be minimized.

10 Claims, 6 Drawing Sheets

(51) Int. Cl.

*F16M 13/00* (2006.01)
*F16L 27/00* (2006.01)
*F16L 55/00* (2006.01)
*F16B 2/06* (2006.01)
*B01L 3/00* (2006.01)

(56) References Cited

U.S. PATENT DOCUMENTS

| 2005/0199299 A1* | 9/2005 | Schick et al. | 137/625.46 |
| 2008/0038152 A1* | 2/2008 | Van Pelt | 422/63 |
| 2008/0107565 A1* | 5/2008 | Vivienne et al. | 422/63 |

* cited by examiner

US 9,126,202 B2

MODULAR MOUNTING AND CONNECTION OR INTERCONNECTION SYSTEM FOR MICROFLUIDIC DEVICES

PRIORITY

This application claims priority to European Patent Application number 06300456.8, filed May 11, 2006, titled "High Throughput Thermally Tempered Microreactor Devices and Methods".

BACKGROUND OF THE INVENTION

1. Field of the Invention

The present invention relates generally to modular mounting and connection or interconnection systems for microfluidic devices, and particularly to such systems especially suited for use with glass, glass-ceramic, and ceramic microfluidic devices.

2. Technical Background

Various methods and structures have been proposed for use in mounting and connecting or interconnecting microfluidic devices, including glass, glass-ceramic and ceramic microfluidic devices. Existing methods include stacking devices directly against each other with seals or couplers positioned between, fixing a metal or polymer fluid coupler to the device by an adhesive or the like, and pressing a multiple-port connector with multiple compression seals up against the device. None of these methods provides for adaptable yet very reliable fluid interconnection and mounting of microfluidic devices, particularly in the case of glass, glass-ceramic, and ceramic microfluidic devices. An adaptable yet very reliable system for fluid interconnection and mounting of microfluidic devices is thus desirable, particularly one well-suited for use with glass, glass-ceramic, and ceramic microfluidic devices.

SUMMARY OF THE INVENTION

The present invention provides a modular mounting and connection or interconnection system for microfluidic devices. The system includes a plurality of end-butting compression-sealing fluid connectors, and one or more clamping structures each structured to hold one of the fluid connectors in compression against a planar surface of a microfluidic device, and to press against the device, on another directly opposing planar surface thereof, either a contact pad or another of the fluid connectors. This provides resistance to the compression on the first planar surface, and puts the microfluidic device in compression only and only at the location of the fluidic connector(s). Each clamping structure including an individually moveable compression-providing element structured to provide a controlled amount of compression. The system desirably further includes one or more device frames each structured so as to receive and hold a microfluidic device with one or more of said clamping structures attached, the device frame being structured to retain the device and attached clamping structures by constraining only one or two of the clamping structures in a manner such that no torsion or bending is applied to the device.

The system may further include one or more system frames structured so as to receive and hold a plurality of device frames in proximity to each other in a three-dimensional array, such that volumes of desired fluid interconnections between devices can be minimized.

The system frame is desirably structured so as to allow individual removal and installation of device frames. The system frame is also desirably structured such that any device frames mounted therein are mounted within a convex volume defined by the extent of said system frame. This provides some mechanical shielding of the mounted devices. The system frame may take the form of a three-dimensional rectangular frame, and such a frame may mount four device frames such that the devices, when mounted, are positioned within the convex rectangular volume defined by the frame, near the respective surfaces thereof.

As one alternative, a clamping structure used in system of the present invention may take the form of an extended shape capable of encircling a microfluidic device against which a fluid connector is to be held in compression. More desirably, a clamping structure used in the system of the present invention is in the form of a C-clamp-type shape, capable of partially encircling a microfluidic device against which a fluid connector is to be held in compression. The individually moveable compression-element may desirably take the form of a threaded collar structured to be engageable by a torque wrench for measured tightening by use of a torque wrench to provide a controlled amount of compression.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

Figure 1:
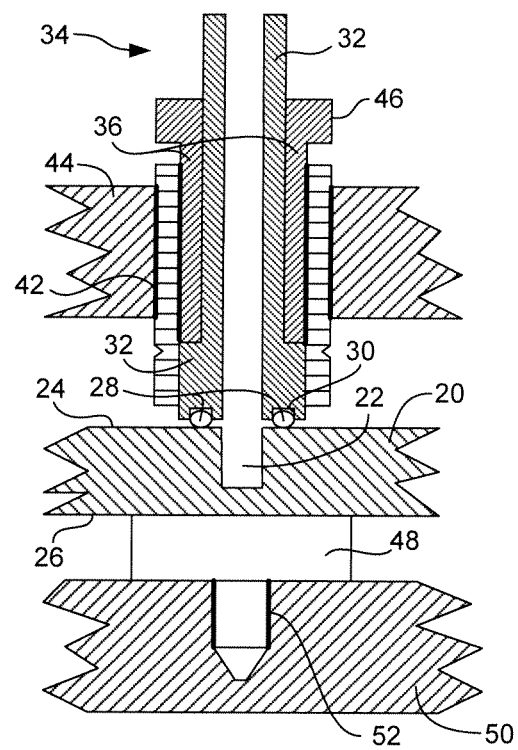
FIG. 1 is a cross-section of one embodiment of a fluid connection or interconnection of the present invention.

FIG. 1 is a cross-section of an embodiment of a fluid connection or interconnection of the present invention. A microfluidic device 20, desirably a glass, glass-ceramic or ceramic microfluidic device 20 includes a fluid input or output opening 22 formed in a planar surface 24 thereof. The area of the planar surface 24 surrounding the opening 22 is contacted by an O-ring 28 held in a groove 30 of an adapter 32 desirably structured at the far end 34 thereof to receive an industry- or laboratory-standard fluid coupling.

The adapter 32 is compressed against the O-ring 28 by a controllable or adjustable compression element in the form of a compression screw 36, which is supported by a sleeve 40 through an adjustable threaded joint 38. The sleeve 40 is in turn supported by support member 44 through a threaded joint 42. The compression screw 36 includes a wrenching surface 46 adapted to be engaged by a torque wrench for controlled compression of the O-ring 28.

A resisting force to the compression of the O-ring 28 is provided against an opposing planar surface 26 of the microfluidic device 20 by a contact pad 48 mounted to a second support member 50 via a threaded joint 52. The contact pad 48 is desirably aligned directly opposite the O-ring 28.

The fluid connection or interconnection of the type shown in FIG. 1 is in many ways well-suited to glass, glass-ceramic, and ceramic microfluidic devices. As one benefit, in contrast to systems with metal ports or other ports of other materials attached directly to a microfluidic device, in the embodiment of FIG. 1, other than the glass, glass-ceramic or ceramic (or other material) of the microfluidic device 20 itself, only O-ring 28 and adapter 32 contact the in-going or out-coming stream, and these are both changeable as needed. The material of O-ring 28 can be selected for particular chemical durability or for particular operating temperatures, or both, as can the material of the adapter 32. Thus an otherwise highly chemically resistant glass, glass-ceramic or ceramic microreactor or microfluidic device is not limited by a permanently attached metal or other fitting that may not be suitable for some uses.

Figure 2:
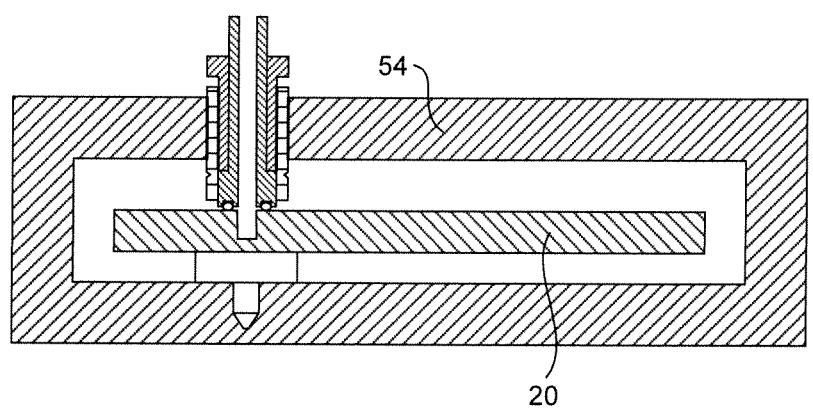
FIG. 2 is a cross-section of the fluid connection or interconnection of FIG. 1 further showing an encircling clamping structure.

As shown in the cross-section of FIG. 2, the support structures 44 and 50 are desirably part of a unitary structure, in this embodiment, in the form of an encircling clamping structure 54 which encircles the microfluidic device 20. Each such unitary clamping structure desirably each clamps onto the device 20 only at a single point, as shown in FIG. 2. If more than one fluid coupling is needed, multiple clamping structures can be used.

Figure 3:
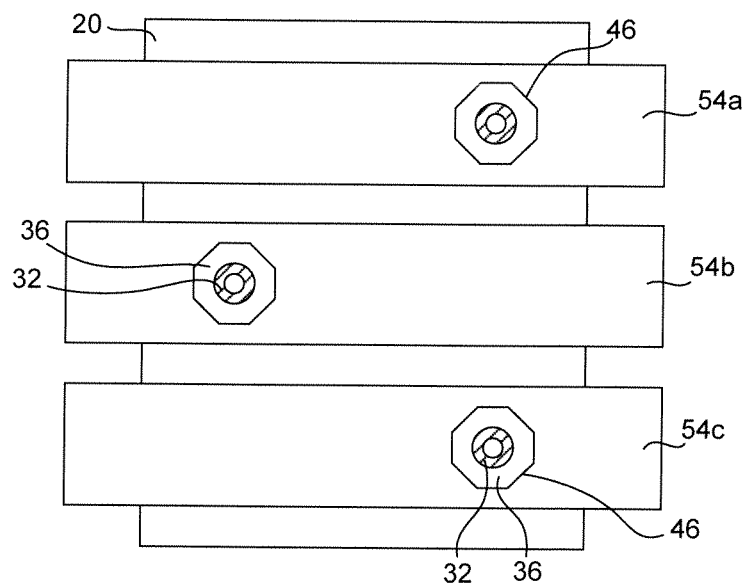
FIG. 3 is a plan view showing multiple encircling clamping structures arranged for use with a microfluidic device.

Use of multiple clamping structures 54a-54c of the encircling type is shown in plan-view in FIG. 3. Each clamping structure provides compression for one fluid coupling. This prevents the fluid coupling from experiencing any significant torsional forces, and prevents the clamping structures from applying significant torsional forces or bending moments to the microfluidic device 20. Each individual fluidic coupling can be adjusted for correct tightness or O-ring compression individually, providing a more reliable seal over all.

Figure 4:
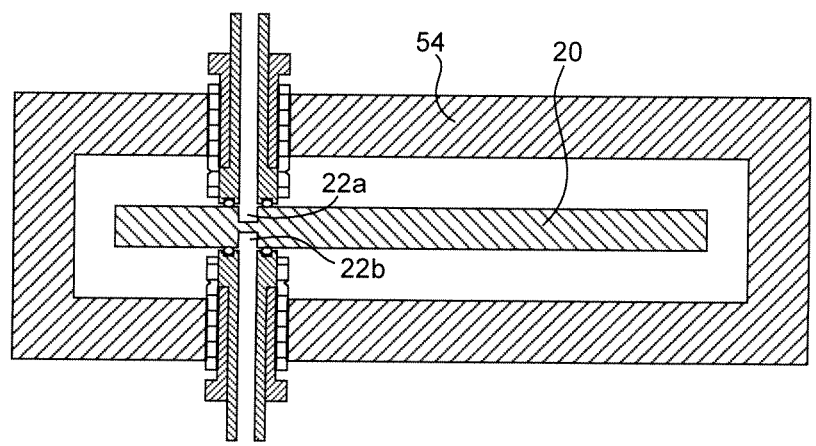
FIG. 4 is a cross-section of another embodiment of a fluid connection or interconnection of the present invention.

FIG. 4 shows a cross-section of another embodiment of a fluid connection or interconnection of the present invention. In the embodiment of FIG. 4, the microfluidic device 20 has two openings 22a and 22b positioned on opposing planar surfaces of the device. Accordingly, instead of a contact pad providing the opposing force for compression of the O-ring, another O-ring forms a fluid seal directly opposing the first, allowing for two fluid connections to be provided with only one clamping structure. Again, because the opposing O-rings are directly aligned, the O-rings and other components do not experience any significant torsional forces, and the microfluidic device 20 experiences little or no torsional and bending forces.

Figure 5:
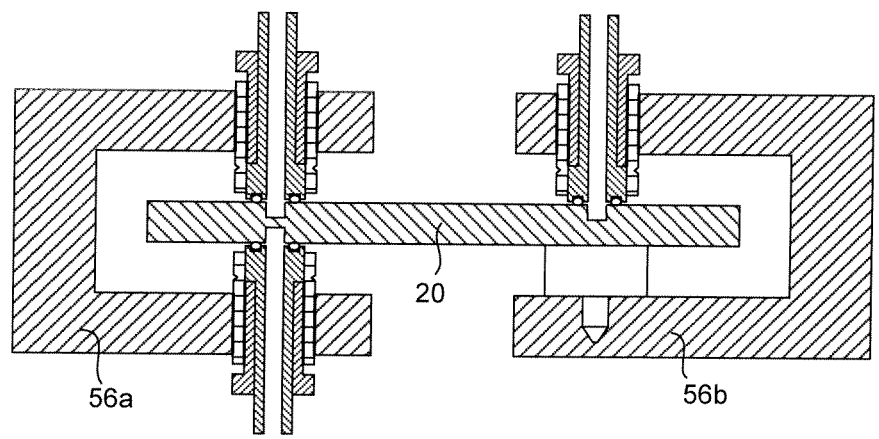
FIG. 5 is cross section of a cross-section of fluid interconnections of the types in FIG. 1 and FIG. 4 with partially encircling C-clamp-type clamping structures.
Figure 6:
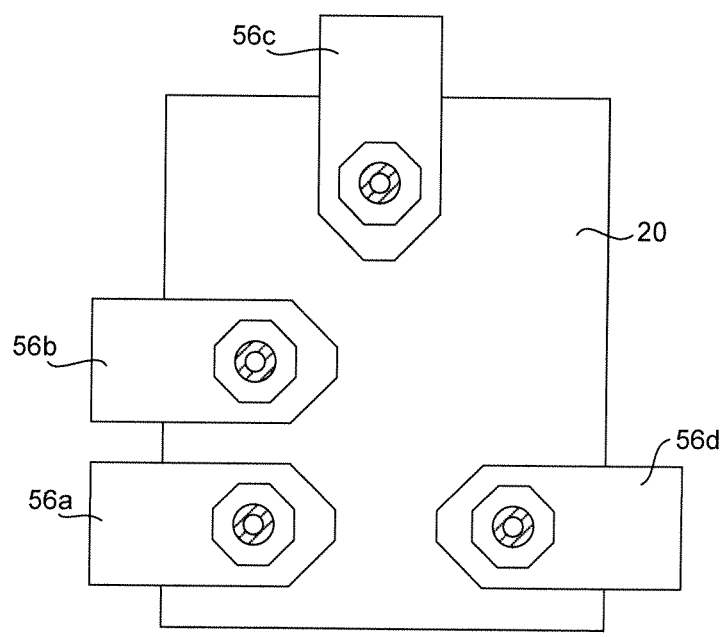
FIG. 6 is a plan view showing multiple partially encircling C-type clamp structures arranged for use with a microfluidic device.

As a desirable alternative to the encircling clamping structure 54 of the embodiments of FIGS. 2-4, partially encircling C-clamp type structures may be used such as clamping structures 56a and 56b shown in FIG. 5. Using the smaller partially-encircling clamping structures 56 allows for more fluidic connections to a single device and more variations in positioning of the fluidic connections, as suggested by the arrangement of fluidic couplings shown in FIG. 6.

The system of the present invention also desirably includes one or more device frames each structured so as to receive and hold a microfluidic device with one or more clamping structures attached. The device frame is desirably structured to allow the clamping structures to rest without force-fitting in the device frame. One embodiment of such a frame 58 is shown in plan view in FIG. 7. In the illustrated embodiment, the frame 58 is a generally planar structure containing recesses 60 each positioned to receive a bottom portion of a partially-encircling clamping device 56. Frame 58 also includes holes 62 for retaining pins.

Figure 8:
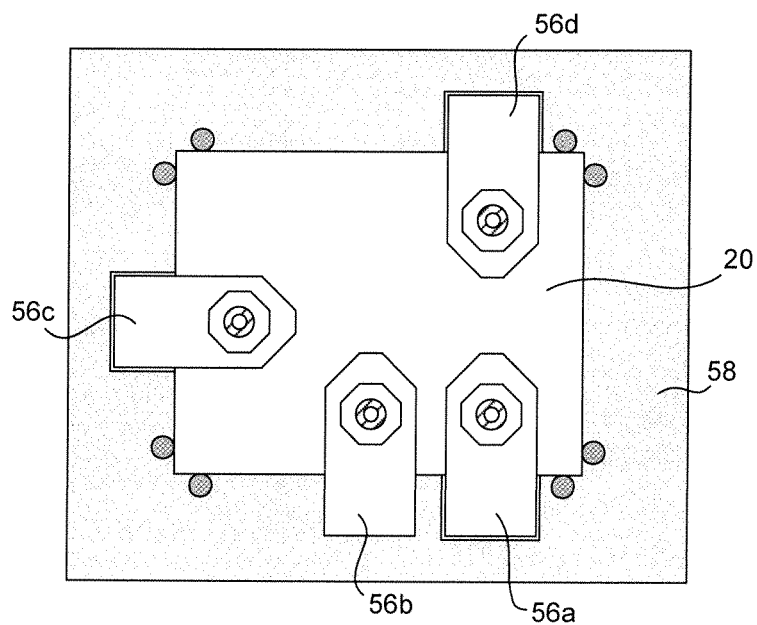
FIG. 8 is a plan view of the device frame of FIG. 7 with the structures and device of FIG. 6 arranged for use therewith.

FIG. 8 shows the frame 58 with a microfluidic device 20 and clamping structures 56 positioned therein. Retaining pins 64 are also in position in the holes 62 to control the lateral position of the microfluidic device 20. One or two of the recesses 60 are structured to constrain the bottom portion of the clamping structure to be received therein, in a manner such that no torsional or bending moments will be applied to the device. This may be accomplished by constraining two clamping devices each partially, so that together the microfluidic device is not over-constrained, or by constraining only one of the clamping devices, as shown in this embodiment, where recess 60a is slightly smaller to constrain portion of the clamping device 56b that it receives.

Figure 7:
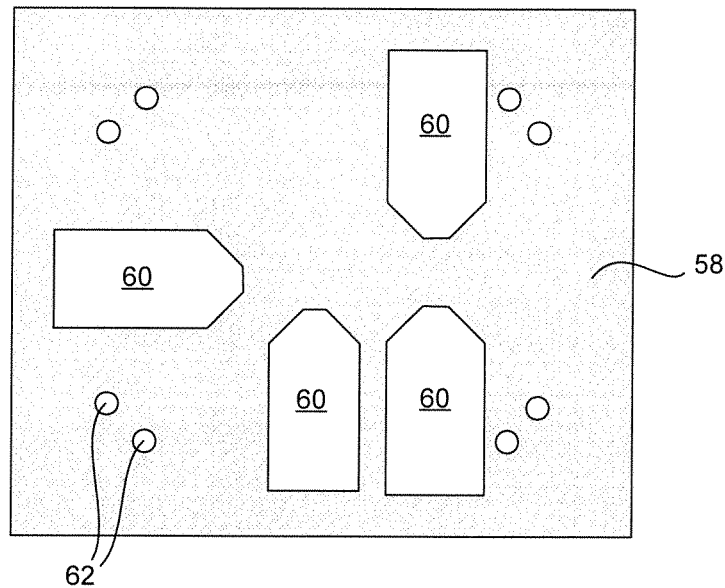
FIG. 7 is a plan view of one embodiment of a device frame according to the present invention.
Figure 9:
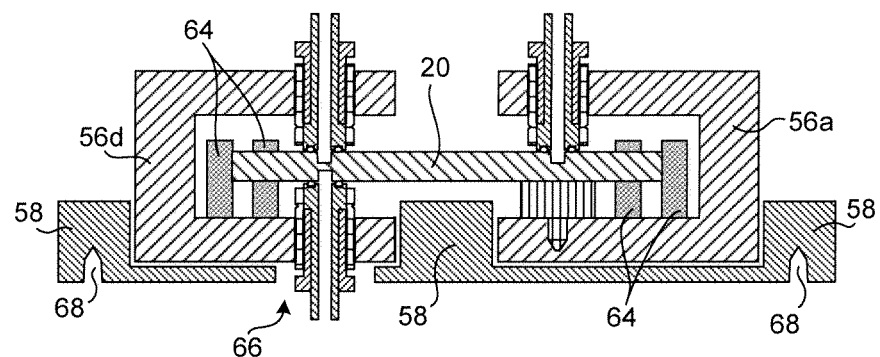
FIG. 9 is a cross-section of the structures shown in FIG. 8.

The structure shown in plan view in FIG. 8 is shown in cross-section in FIG. 9, with everything in FIG. 9 shown only in cross section, except for the pins 64 which are shown for reference, even though they are in the background of the plane of cross-section. In the view of FIG. 9 may be seen that the device frame 58 has recesses for a portion of the clamping structures 56, but the clamping structures are desirably not so far recessed that the microfluidic devices rest on the device frame 58. Instead, the microfluidic device 20 rests only on O-rings or O-rings and associated opposing contact pads, with some small contact with retaining pins 64. Thus very little bending and torsional stress is applied to the microfluidic device by the fluid connection or interconnection and mounting system of the present invention. Note also that device frame 58 may desirably include a recess 66 for a fluid coupling when a fluid coupling is made to two sides of the microfluidic device 20 at the same position as on the left side of the Figure. The device frame 58 may also include mounting structures such as mounting holes 68 or any other convenient provision for mounting in a larger system or system frame. Note that clamping devices 56a and 56d as shown in the cross section of FIG. 9 are not constrained by the device frame 58. Their position and the position of microfluidic device 20 is controlled by the position of clamping device 56b as shown in FIGS. 7 and 8.

Figure 10:
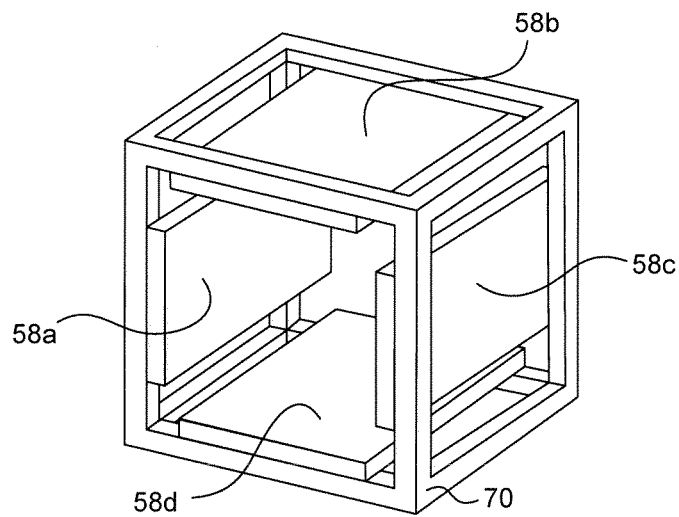
FIG. 10 is a semi-schematic perspective view of one embodiment of a system frame according to the present invention with four device frames mounted with the concave volume thereof.

FIG. 10 is a semi-schematic perspective view of one embodiment of a system frame 70 according to the present invention. A system frame such as system frame 70 may desirably take the form of a three-dimensional cubic or rectangular framework, preferably of metal or some other material that can provide a degree of physical protection. Device frames 58a-58d (with microfluidic devices mounted therein but not shown for ease of illustration) are then desirably mounted within the concave volume of the system frame 70, that is, within the minimum volume having no concavities that can contain the device frame 70. Mounting within this volume gives the mounted microfluidic devices some protection from impact by larger or extended objects which will be blocked by the system frame 70.

Mounting four devices each near the outer surface of a face of a cubic or rectangular device frame, as shown in FIG. 10, can have several advantages. For one thing, any one of the four device frames, hence any one of the four microfluidic devices, can be dismounted and replaced without removing any of the other three. For another advantage, the positioning of the microfluidic devices as shown in the Figure allows easy visual or other optical monitoring of both sides of the mounted devices, yet because the devices are in a three-dimensional array (rather than in a stack, which is a one-dimensional array, or a common plane arrangement, which is a two-dimensional array), with two of the devices at right angles to the others, the distances between the devices for fluidic coupling are still relatively short.

Figure 11:
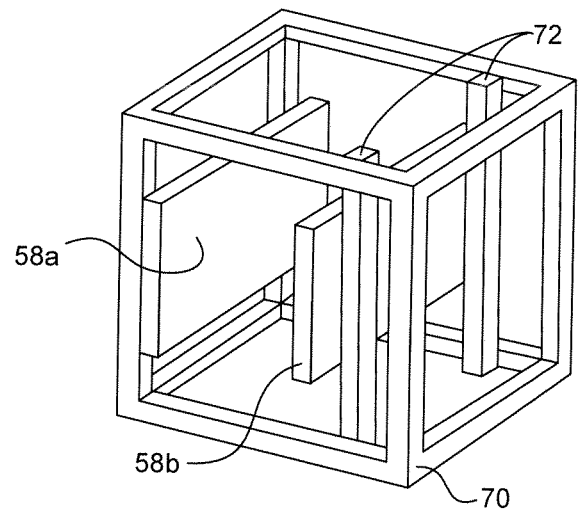
FIG. 11 is a semi-schematic perspective view of another embodiment of a system frame according to the present invention.

FIG. 11 is a semi-schematic perspective view of another embodiment of a system frame according to the present invention. The system frame 70 of FIG. 11 includes adjustable frame members 72 that allow positioning of a device frame 58b and its associated device essentially anywhere within the system frame 70. This provides flexibility for various mounting needs.

Figure 12:
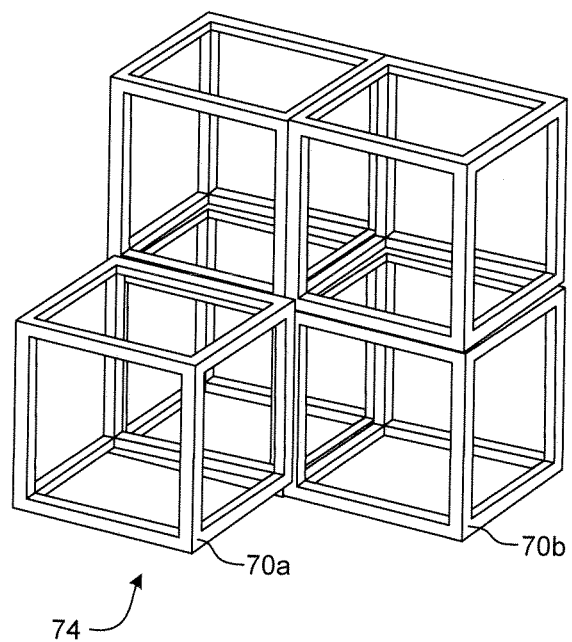
FIG. 12 is a semi-schematic perspective view of multiple system-frames mechanically interconnected, as may be useful in forming larger systems according to the present invention.

System frames like those of FIG. 10 and FIG. 11 can be mechanically joined to form large systems 74 that include multiple system frames, as shown in FIG. 12. This provides modularity on the system level, while the device frames provide modularity on the device level, and the clamping structures and associated fluidic couplings provide modularity even on the individual coupling level. The result is a flexible and adaptable modular mounting and connection or interconnection system for microfluidic devices.

The invention claimed is:

1. A modular mounting and connection or interconnection system for microfluidic devices, the system comprising:
   a plurality of end-butting compression-sealing fluid connectors;
   multiple clamping structures each structured (1) to hold only one of the fluid connectors in compression against a planar surface of a microfluidic device, and (2) to press against said device, at a position aligned directly opposite on another directly opposing planar surface thereof, either (a) a contact pad or (b) only one other of said fluid connectors so as to provide a resistance to said compression, each clamping structure including an individually moveable compression-providing element structured to provide a controlled amount of compression.

2. The system as claimed in claim 1 further comprising one or more device frames each structured so as to receive and hold a microfluidic device with said multiple clamping structures attached, the device frame being structured to retain the device and attached clamping structures by constraining only one or two of the clamping structures in a manner such that no torsion or bending is applied to the device.

3. The system as claimed in claim 2 further comprising one or more system frames structured so as to receive and hold a plurality of device frames in proximity to each other in a three-dimensional array such that volumes of desired fluid interconnections between devices can be minimized.

4. The system as claimed in claim 3 wherein at least one of the one or more system frames is structured so as to allow individual removal and installation of device frames.

5. The system as claimed in claim 3 wherein at least one of the one or more system frames is structured such that any device frames mounted in said system frame are mounted within a convex volume defined by the extent of said system frame.

6. The system as claimed in claim 3 wherein at least one of the one or more system frames comprises a three-dimensional rectangular frame.

7. The system as claimed in claim 6 wherein the three-dimensional rectangular frame defines a rectangular volume and wherein said frame comprises mounts for device frames such that devices, when mounted, are positioned within said rectangular volume near the respective surfaces thereof.

8. The system as claimed in claim 1 wherein a clamping structure of the multiple clamping structures comprises an extended shape capable of encircling a microfluidic device against which a fluid connector is to be held in compression.

9. The system as claimed in claim 1 wherein a clamping structure of the multiple clamping structures is in the form of a C-clamp-type shape capable of partially encircling a microfluidic device against which a fluid connector is to be held in compression.

10. The system as claimed in claim 1 wherein said individually moveable compression-element comprises a threaded collar structured to be engageable by a torque wrench for measured tightening by use of a torque wrench to provide a controlled amount of compression.

* * * * *